United States Patent [19]

Pringle, Jr. et al.

[11] 3,958,390
[45] May 25, 1976

[54] PACKAGING

[75] Inventors: Frank E. Pringle, Jr., Sheboygan; Harvey Heiner, New Holstein; Gary Lee Gehrke, Madison, all of Wis.

[73] Assignee: Hayssen Manufacturing Co., Sheboygan, Wis.

[22] Filed: Jan. 2, 1975

[21] Appl. No.: 538,136

[52] U.S. Cl. .................................. 53/22 A; 53/28; 53/112 A; 53/180 R
[51] Int. Cl.² ........................................ B65B 31/04
[58] Field of Search .................. 53/22 A, 28, 112 A, 53/180, 375

[56] References Cited
UNITED STATES PATENTS

| | | | |
|---|---|---|---|
| 3,009,298 | 11/1961 | Gerlach et al. | 53/22 A |
| 3,090,174 | 5/1963 | Kraft | 53/22 A |
| 3,210,905 | 10/1965 | Gerlach | 53/112 A |
| 3,274,746 | 9/1966 | James et al. | 53/22 A |
| 3,777,448 | 12/1973 | Howe | 53/375 X |
| 3,788,917 | 1/1974 | Linda | 53/375 X |

*Primary Examiner*—Travis S. McGehee
*Attorney, Agent, or Firm*—Koenig, Senniger, Powers and Leavitt

[57] ABSTRACT

The method of and apparatus for packaging units in flexible sheet material which is heat-sealable at least on one side, in which a web of the material is formed into a tube with an inside-face-to-inside-face longitudinal seam by bringing the side margins of the web into inside-face-to-inside-face engagement and pressing them together at a sealing station, and heating the inside faces of said margins as they converge toward one another and meet at the sealing station by directing a stream of hot gas against them. Transverse seals are formed across the tube at package length intervals with a unit to be packaged in the tube between successive transverse seals. The gas may be a preservative gas for preservation of the unit in each package. Additionally, preservative gas may be introduced into the tube downstream from said sealing station.

14 Claims, 9 Drawing Figures

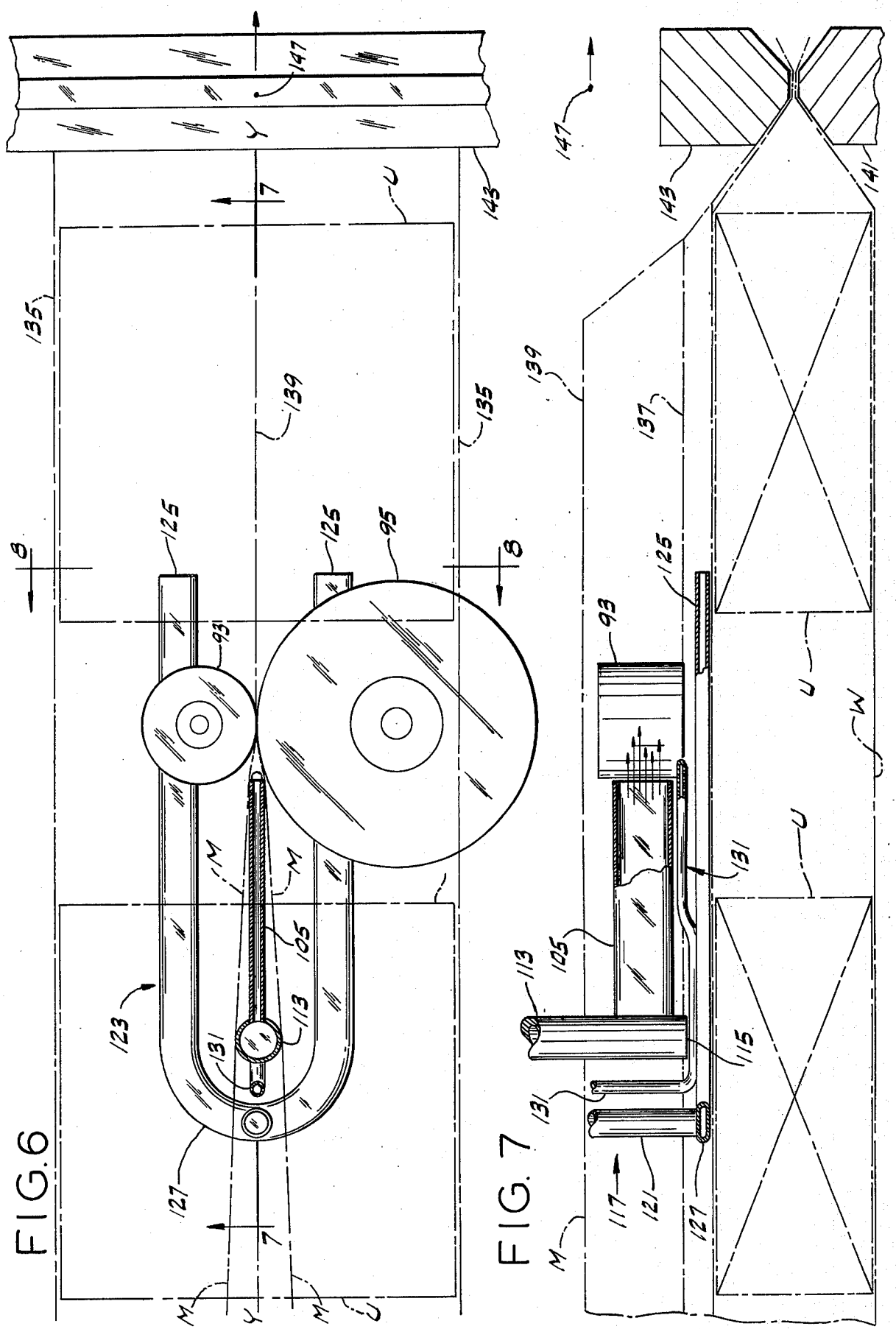

PACKAGING

BACKGROUND OF THE INVENTION

This invention relates to packaging, and more particularly to a method of and apparatus for wrapping products in flexible sheet material in which a continuous web of such material is formed into a tube, and transverse seals are formed across the tube at package length intervals with a unit of the product to be packaged between successive seals.

The invention may be regarded as involving improvements on the method and apparatus disclosed in the U.S. Pat. No. 3,274,746 of Robert C. James, David A. Wilson and Frank E. Pringle, Jr., issued Sept. 27, 1966. In the method and apparatus of this patent, a web of flexible sheet material is continuously fed forward and formed into a tube with an inside-face-to-inside-face longitudinal seam. Units to be packaged, e.g., units of cheese, feed forward on the web, spaced at intervals corresponding to the desired package length, the web being formed into a tube around the units. Transverse seals are formed across the web at package length intervals between units by a rotary transverse sealer of the type disclosed in U.S. Pat. No. 2,976,657 issued Mar. 28, 1961, the resultant packages being severed at the seals. The web with the units thereon travels under a hood or manifold for supplying to the tube of packaging material a gas, e.g., carbon dioxide, for preservation of the units in the packages. Side portions of the web are folded up at opposite sides of the manifold and the side margins of the web are brought together in inside-face-to-inside-face relation at the apex of the former. They then pass between a pair of heater bars (indicated at 22 in U.S. Pat. No. 3,274,746) for heating them, and then are pressed together by means of a pair of pressure rolls to form the longitudinal seam.

A problem has occurred in certain instances of use of the apparatus shown in U.S. Pat. No. 3,274,746 to package products in certain types of flexible packaging material which have a coating of heat-sealable plastic on one face of a non-heat-sealable substrate. In such case, the heat must penetrate the substrate to reach and soften the heat-sealable face of the material, and in some instances the degree of heat required to penetrate the substrate for this purpose may be so high as to damage the substrate. This method reduces the speed potential of the equipment because of the time taken for the heat to penetrate the substrate. Another problem that has occurred in certain instances of use of said apparatus has been that of relatively high gas consumption.

SUMMARY OF THE INVENTION

Accordingly, among the several objects of this invention may be noted the provision of an improved method and apparatus of the class above described accomplishing heating of the inside faces of the side margins of the web material without the danger of damaging the substrate of the material; and the provision of such a method and apparatus accomplishing gas flushing of the tube of packaging material with reduced gas consumption. It further allows higher speeds due to the lower Btu's required to effect a seal.

The method of this invention involves the packaging of units (e.g., units of cheese) in flexible sheet material which is heat-sealable at least on one face thereof. In general, the method comprises forming into a tube a web of said material as it is fed forward with said one face of the material on the inside of the tube, by bringing the side margins of the web into inside-face-to-inside-face engagement at a sealing station, the side margins converging toward one another as they travel toward and meet at said station. The inside faces of said margins are heated as they converge toward one another and meet at said station for heat-sealing them together by directing a stream of hot gas on the inside faces of said margins as they travel toward said sealing station. The heated margins are pressed to seal them together at said station, and transverse seals are formed across the tube at package length intervals with a unit to be packaged in the tube between successive transverse seals.

In general, apparatus of this invention comprises means for forming into a tube a web of said material as it is fed forward with said one face of the material on the inside of the tube by bringing the side margins of the web into inside-face-to-inside-face engagement at a sealing station, said side margins converging toward one another as they travel toward and meet at said station. Means is provided for heating the inside faces of said margins as they approach a pressing means, comprising means for directing a hot stream of gas on the inside faces of said margins and means is provided for pressing these hot margin surfaces together, after heating, to effect the seal. The apparatus further comprises means for forming transverse seals across the tube at package length intervals with a unit to be packaged in the tube between successive transverse seals.

Other objects and features will be in part apparent and in part pointed out hereinafter.

BRIEF DESCRIPTION OF THE DRAWINGS

FIG. 6 is an enlarged fragment of FIG. 3, with certain detail omitted, showing the formation of the longitudinal seam for the tube;

FIG. 7 is a view in section generally on line 7—7 of FIG. 6.

Corresponding reference characters indicate corresponding parts throughout the several views of the drawings.

DESCRIPTION OF THE PREFERRED EMBODIMENT

Figure 1:
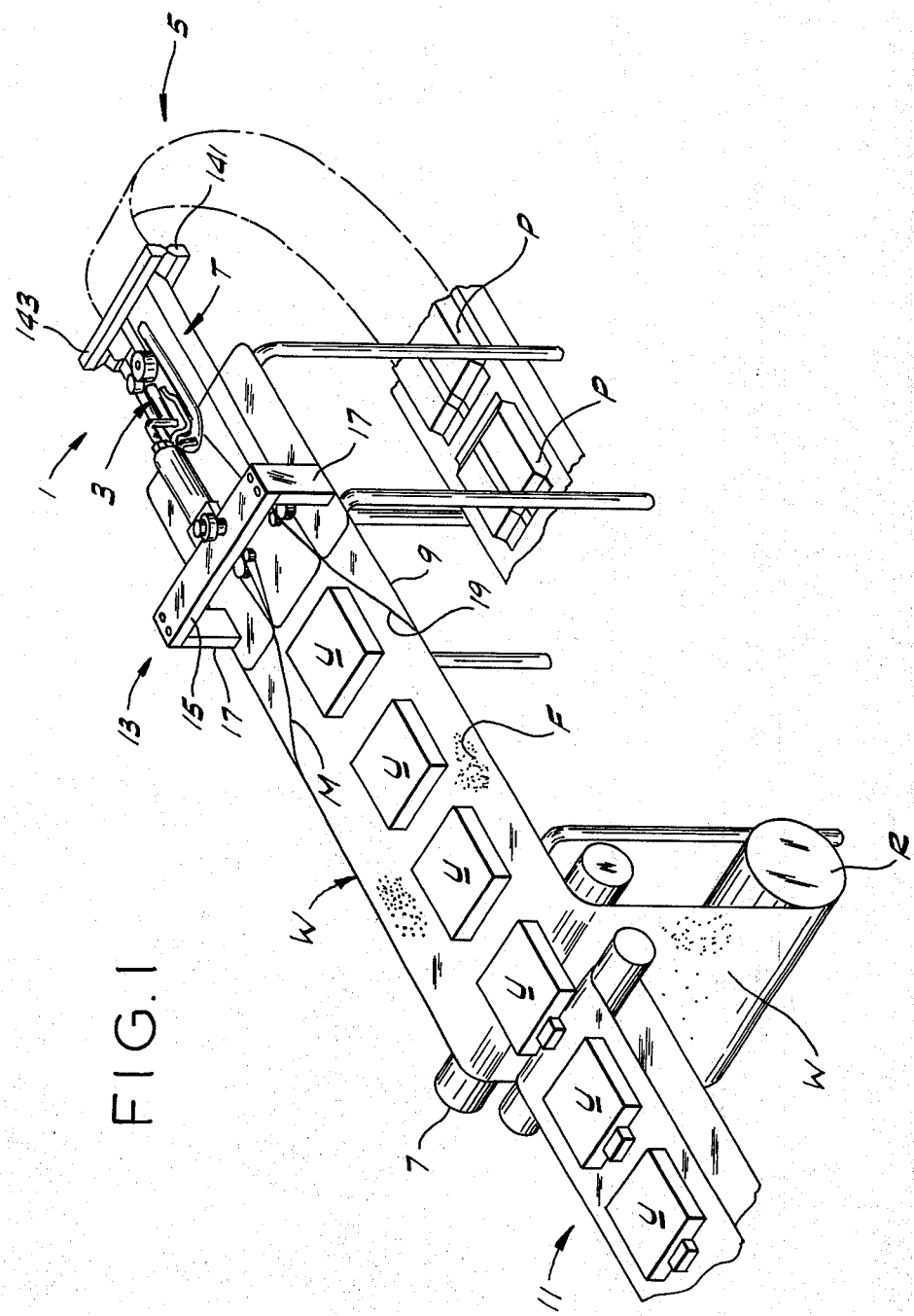
FIG. 1 is a perspective of a packaging apparatus in which the invention is incorporated.

Referring to the drawings, first more particularly to FIG. 1, the invention is shown as utilized in a method and apparatus similar to the method and apparatus disclosed in U.S. Pat. No. 3,274,746, involving forming into a tube or tubing T a web W of flexible sheet packaging material which is heat-sealable at least on one face F thereof. The web is formed into the tube as it is fed forward (toward the right as viewed in FIG. 1) with said one face F of the material on the inside of the tube (with face F facing upward as viewed in FIG. 1) by bringing the side margins M of the web into inside-faceto-inside-face engagement at a sealing station 1. As distinguished from the system of U.S. Pat. No. 3,274,746 wherein the side margins are in losse contact with one another from the apex of the manifold to the pressure rolls and are heated from the outside, the side margins M converge toward one another as they travel toward and meet at station S, and are heated from the inside (rather than from the outside) by heating means 3 which directs a stream of hot gas on the inside faces of said margins as they travel toward station 1. At 5 is generally indicated transverse sealing means for forming transverse seals across the tube T at package length intervals with a unit U to be packaged in the tube between successive transverse seals.

More particularly, the web W is unwound from a roll R of the web material, from which it travels up and around a guide roll 7 at the upstream or entrance end of a table generally indicated at 9 carrying various elements of the apparatus (including the guide roll). The web travels forward from the guide roll in a horizontal path over the table with its heat-sealable face F up. At 11 is indicated an infeed conveyor for delivering units U to be packaged spaced at package length intervals with appropriate space between successive units onto the web (onto its upper face F). Once the units have been delivered onto the web W, they proceed forward with the web. As the web proceeds forward with units U thereon, it is formed into the tube T around the units by means of a tube former indicated in its entirety at 13.

Figure 2:
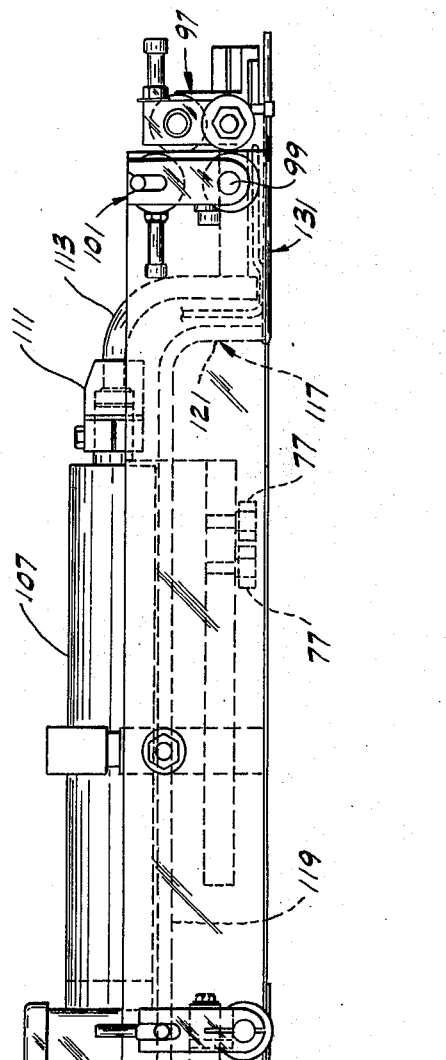
FIG. 2 is a side elevation of the tube former of the apparatus.

The tube former 13 (see particularly FIGS. 2–5) is suspended from a bridge 15 which extends above the table 9 transversely of the table supported on posts 17 at opposite sides of the table. The tube former comprises a frame indicated in its entirety at 19 secured to the lower end of a rod 21 vertically adjustable in a screw clamp 23 carried by the bridge, the screw of this clamp being indicated at 25. The frame 19 comprises a cross-head 27 constituted by a flat bar secured to the lower end of the rod extending transversely of the tube former. Secured to the bottom of this cross-head at its left end is a relatively short rail 29 and secured to the bottom of the head at its right end is a relatively long rail 31, these rails extending longitudinally of the tube former. Left and right are as viewed in the direction of forward travel of the web through the apparatus, which is toward the right as viewed in FIGS. 2 and 3. Secured to the bottom of the head 27 at its center is a relatively short central shoe 33 extending longitudinally of the tube former in its vertical central longitudinal plane Y.

For forming the web W into the tube T around the units U, the tube former has means indicated generally at 35 providing a pair of guide slots 37L and 37R on opposite sides of the central plane Y—Y which converge toward one another in forward direction in respect to the travel of the web from the entrance (upstream) end of the tube former to their exit (downstream) ends at the entrance (upstream) end of a long single guide slot 39 extending longitudinally of the tube former. The means 35 providing the slots comprises left and right hand horizontal plates 41L and 41R on opposite sides of a central plate 43. Plates 41L and 41R are mounted on the bottom of the left and right side rails 29 and 31 extending inwardly toward one another from these rails, and have inner edges indicated at 45 on opposite sides of the plane Y converging toward this plane in forward (downstream) direction. The central plate 43 is mounted on the bottom of the shoe 33 extending outwardly on both sides of this shoe, and has outer edges indicated at 47 extending parallel to the inner edges 45 of the outer plates 41L and 41R and spaced therefrom a distance greater than the web thickness to provide the guide slots 37L and 37R. The central plate 43 is relatively short, extending from the entrance end of the tube former just past the forward (downstream) edge of the cross-head 27. The plates 41L and 41R are considerably longer, extending from the entrance end of the tube former well past the downstream end 49 of the central plate 43. They have relatively narrow forward end extensions indicated at 51L and 51R. The slot 39 between the inner edges 45 of plates 41L and 41R tapers in width gradually from its beginning at the downstream end 49 of the central plate 43 to its exit end at the downstream end of the extensions 51L and 51R.

The web W, with units U thereon, travels over the top of the table 9 and under the tube former 13. As it travels forward, its left and right sides are folded up on the sides of units U into the slots 37L and 37R, the left and right margins of the web being brought closer and closer together in inside-face-to-inside-face relation as it travels forward through these slots and thence through the single tapered slot 39, three sets of rolls 53, 55 and 57 being provided for gripping the left and right margins of the web above the horizontal plane of the plates 41L, 41R and 43.

The first set of rolls 53 comprises a left-hand pair of rolls 53L and a right-hand pair of rolls 53R, each of these pairs comprising a relatively small inside roll 55 and a relatively large outside roll 57. Each pair is mounted with its pass plane generally vertical and with the point of contact of the two rolls of the pair generally directly above the respective edge (the left-or right-hand edge, as the case may be) of the central plate 43 (see FIG. 3). The inside rolls 55 are carried by the shoe 33 for rotation on fixed vertical axes. The outside rolls 57 are carried by blocks secured to a rock shaft 63 extending across the tube former above the plates 41L, 43 and 41R, journalled at its ends in the side rails 29 and 31. Air cylinders 65 mounted on the outside of the side rails are connected as indicated at 67 to cranks 69 on the outer ends of the rock shaft 63 for rocking it. This is for the purpose of adjusting the angle of the outside rolls 57 relative to the inside rolls 55 to maintain the margins of the web feeding forward between the two pairs of rolls at the proper elevation. Suitable sensing means (not shown) such as is known in the art may be provided for controlling the air cylinders for this purpose.

The second set of rolls 55 comprises a left-hand pair of rolls 55L and a right-hand pair of rolls 55R, each of these pairs comprising a relatively small inside roll 71 and a relatively large outside roll 73. Each pair is mounted with its pass plane generally vertical and with the point of contact of the two rolls of the pair generally above the respective side (the left or right side, as the case may be) of the slot 39. The inside rolls 71 are carried by the shoe 33 for rotation on fixed vertical axes just above the horizontal plane of the plates 41L, 43 and 41R. The outside rolls 73 are mounted as indicated at 75 for angular adjustment thereof relative to the inside rolls 71.

The third set of rolls 57 comprises a left-hand pair of rolls 57L and a right-hand pair of rolls 57R, each of these pairs comprising a relatively small inside roll 77 and a relatively large outside roll 79. Each pair 57L and 57R is mounted with its pass plane generally vertical and with the point of contact of the two rolls of the pair generally above the respective side (the left or right side, as the case may be) of the slot 39 adjacent the exit (downstream) end of the slot. The inside rolls 77 are carried by a member 81 of the frame 19 for rotation on fixed vertical axes. The outside rolls 79 are mounted for rotation at the free ends of a pair of arms 83 pivoted at 85 on a bar 87 secured to the right-hand rail extending transversely of the tube former, the arrangement being such that the outside rolls 79 are swingable toward and away from the inside rolls 77. A spring 89 is provided for biasing the outside rolls toward the inside rolls.

As the web W travels forward, its side margins M extend up on the inside of the inside edges 45 of the plates 41L and 41R and the plate extensions 51L and 51R, gripped by the pairs of rolls of the sets 55 and 57, and come closer and closer together in inside-face-to-inside-face relation. To complete the formation of the web into the tube, the margins are finally brought into inside-face-to-inside-face engagement with one another at the sealing station 1, their inside faces being heated by heating means 3 as they converge toward one another and meet at said station.

Means indicated generally at 91 is provided at the sealing station 1 for pressing the heated margins of the web to seal them together to complete the formation of the tube. As shown best in FIGS. 2 and 3, this pressing means comprises a pair of rolls 93 and 95, roll 93 being a relatively small roll on the left and roll 95 being a relatively large roll on the right. The pass plane of these rolls is generally vertical and defines the central longitudinal plane Y of the tube former. The rolls 93 and 95 are carried by a bracket 97 cantilevered toward the left from the right-hand side rail 31 at the forward (downstream) end of the latter. The large roll is knurled. The bracket is pivoted at 99 for angular adjustment about a horizontal axis extending transversely of the tube former, and is adjustable via means such as indicated at 101. The roll 95 is adjustable toward and away from the roll 93 via means such as indicated at 103.

The heating means 3, which directs a stream of hot gas on the inside faces of the margins of the web as they travel toward the pressing means and come together in a V at the pressing means (this V appearing in FIG. 6), comprises a nozzle 105 positioned to direct a stream of hot gas in downstream direction in relation to the travel of the web toward the apex of the V to hot blast said margins as they meet at the apex of the V. The hot gas is supplied via a heater 107 mounted on the tube former frame 19 extending longitudinally of the tube former. The heater comprises a cylindrical casing having an inlet 109 for gas to be heated at its upstream end and an outlet 111 for hot gas at its downstream end, electrical resistance heating elements (not shown) being provided in the casing for heating gas flowing through the casing from the inlet to its outlet. Gas (e.g., carbon dioxide gas) is delivered from a gas cylinder (not shown) to the heater inlet 109 via a suitable line (also not shown). Heated gas is delivered from the heater outlet 111 to the nozzle 105 via an elbow 113 connected at one end to the outlet and extending forward and down from the outlet, the nozzle extending forward from the lower end of the elbow, which is closed as indicated at 115 in FIG. 7. The nozzle 105 is of flat tubular cross section (rather than of circular cross section) and extends horizontally forward from the lower end of the elbow 113 generally at the elevation of the presser rolls 93 and 95 in the central longitudinal plane Y of the tube former, terminating somewhat short of the nip of the presser rolls (i.e., somewhat short of the apex of the V of the side margins of the web). Thus, hot gas blowing out of the forward (downstream) end of the nozzle hot blasts the inside faces of the margins as they come together in face-to-face engagement in the nip of the rolls 93 and 95. The gas is delivered in a stream in the central longitudinal plane Y of the tube former which generally bisects the V.

Figure 8:
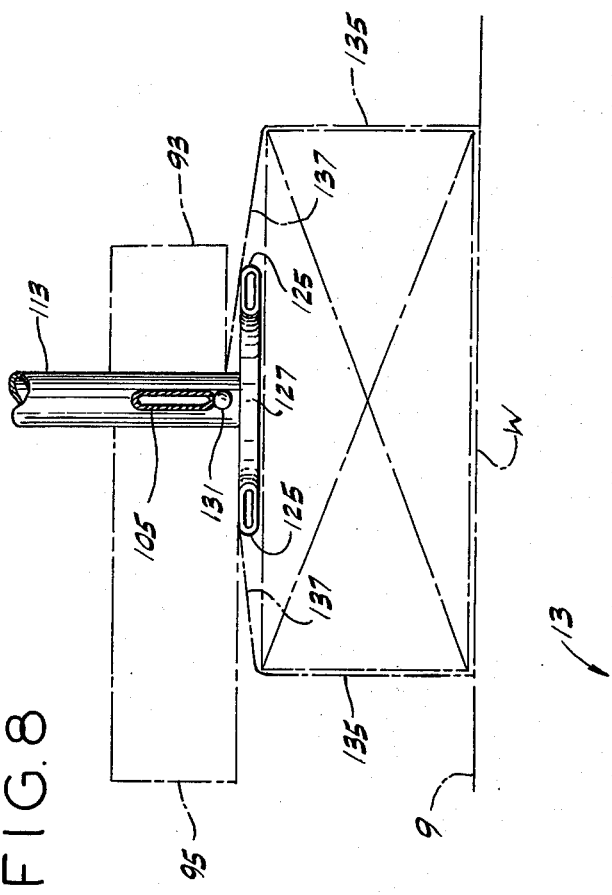
FIG. 8 is a view in section generally on line 8—8 of FIG. 6.
Figure 3:
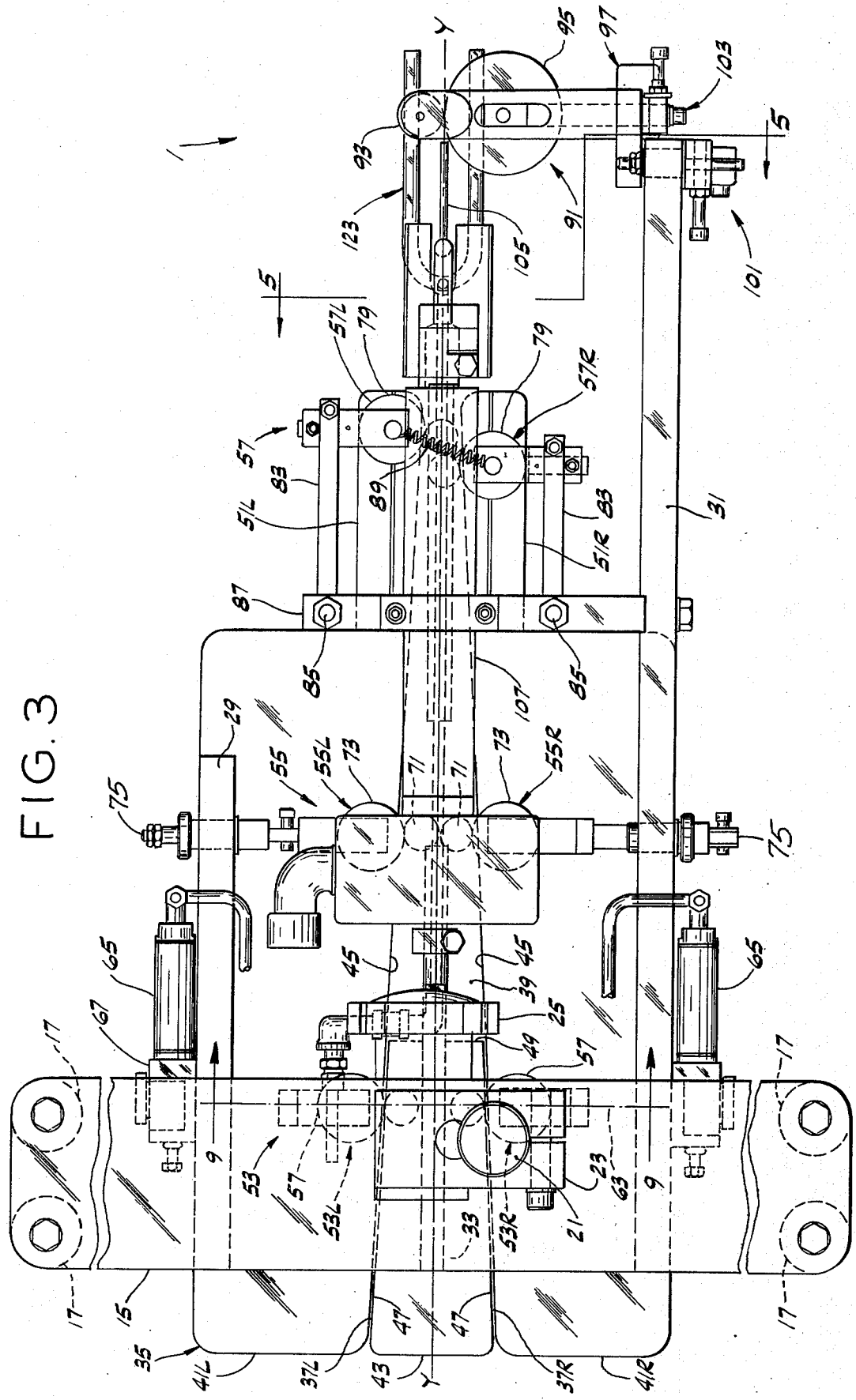
FIG. 3 is a plan of FIG. 2.
Figure 4:
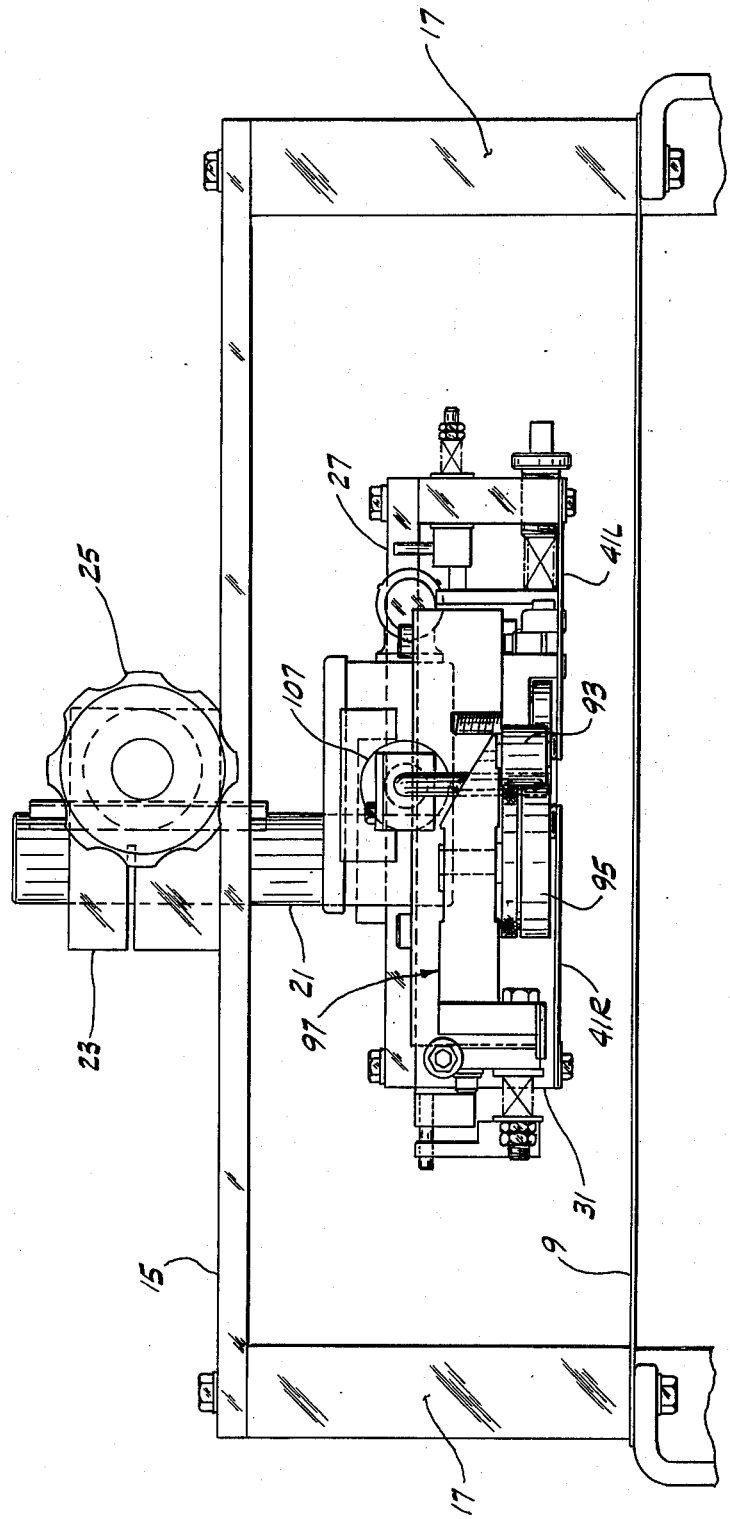
FIG. 4 is a right end view of FIG. 2.
Figure 5:
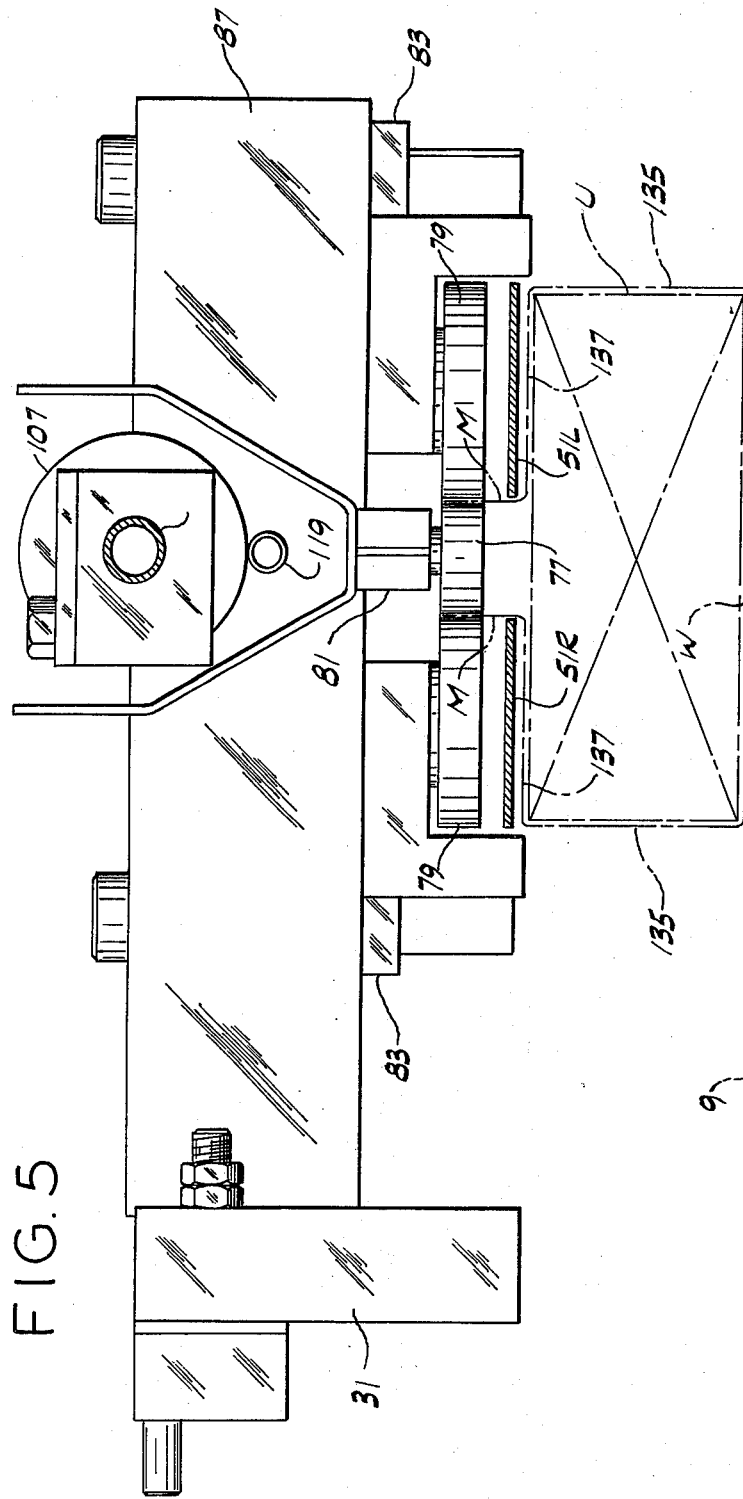
FIG. 5 is a vertical section on line 5—5 of FIG. 3.
Figure 9:
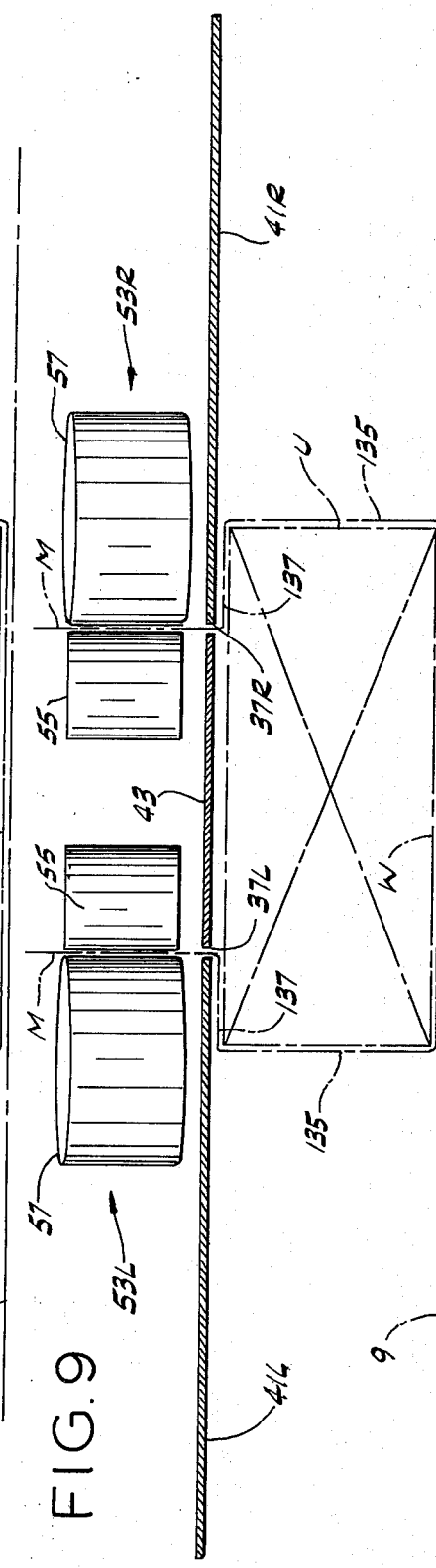
FIG. 9 is a view in section generally on line 9—9 of FIG. 3.

Means indicated generally at 117 is provided for introducing a preservative gas, such as carbon dioxide or nitrogen, or any suitable gas other than air to replace the air in the packages being formed. This means comprises a gas supply pipe 119 extending longitudinally of the tube former in its central longitudinal plane Y underneath the heater 107. The forward end of this pipe is bent down as indicated at 121 and a nozzle 123 extends horizontally forward from the lower end of the forward end of the pipe for delivering the gas to the tube being formed. The nozzle 123, as shown in FIGS. 3 and 6, is a doublebranched nozzle of U-shape in plan having two side arms each designated 125 extending forward from a semicircular base portion 127 for introducing gas into the tube at two points spaced across the width of the tube. The base portion 127 and arms 125 of the nozzle 123 are of flat tubular cross section (rather than of circular cross section), as appears in FIG. 8. The lower end of the bent-down forward end portion 121 of the pipe 119 is connected to the center of the top of the base portion 127 of the U. The two arms or branches 125 of the nozzle extend forward past the rolls 93 and 95. They are adapted to overlie the units U on the web W and in the tube. The upwardly extending side margins of the web are adapted to pass on opposite sides of the downturned forward end portion 121 of the pipe 119 and on opposite sides of the elbow 113, and the portions of the web which overlie the units U are adapted to pass over the top of the base portion 127 and arms 125 of the nozzle 123.

Whenever the feed of the web W and units U through the apparatus is stopped, but is to be resumed before long, it is desirable to maintain the flow of gas through the heater 107 to avoid having to wait for delivery of hot gas for start-up. If, however, the flow of hot gas is continued when the web stops, the hot gas blowing forward out of the forward end of the nozzle 105 on the inside faces of the margins of the web may burn them. Accordingly, means indicated at 131 is provided for diverting the hot gas issuing from the foward end of the nozzle to flow up and out from between the margins. This means comprises an air jet for blowing air up across the forward end of the nozzle, this jet being adapted to be supplied with air via a pipe 133 and suitable valve means (not shown) whenever the web stops. The air blowing up across the tip of the nozzle diverts and diffuses the hot gas to flow up and out.

In packaging the units U, the web W, which is heat-sealable at least on its face F, is unwound from the roll R, and fed around the guide roll 7 and over the table 9 with its heat-sealable face F up. It is pulled from the roll and over the table by the operation of the transverse sealing means 5 (for which reference may be made to the aforesaid U.S. Pat. No. 2,976,657). Units U are delivered by the infeed conveyor 11 on to the web spaced at package length intervals with sufficient space between successive units for sealing of the tube T (formed around the units) between the units by means 5. The units U proceed forward with the web. Side portions of the web are folded up on the sides of the units and over the top of the units and the side margins M of the web are received in the converging slots 37L and 37R and the single tapered slot 39. The units U pass under the plates 41L, 43 and 41R. The margins M are gripped above plates 41L, 43 and 41R by the roll pairs 53L and 53R, above the plates 41L and 41R by the roll pairs 55L and 55R and above the plate extensions 51L and 51R by the roll pairs 57L and 57R. From the latter, the margins M pass on opposite sides of the bent-down forward end portion 121 of gas pipe 119, the pipe 133 and the downwardly extending leg of the elbow 113 to the nip of the presser rolls 93 and 95 at the sealing station 1, converging and coming together in a V at these rolls as appears in FIG. 6. Portions 135 of the web extend up on opposite sides of the units U and portions 137 of the web extend over the top of the units and over the branches 125 of the nozzle 123 (see FIG. 8).

As the margins M of the web W converge toward one another and approach and meet in the nip of the presser rolls 93 and 95 at the sealing station 1, the nozzle 105 directs a stream of hot gas (e.g., carbon dioxide) in downstream direction (toward the right as viewed in FIGS. 6 and 7) in the plane Y generally bisecting the V of the margins. This stream impinges on the inside faces of the margins as they meet at the apex of the V (at the nip of the rolls) and heats said faces up to sealing temperature. The heated faces are immediately pressed together by the rolls to cause them to become sealed together to form an inside-face-to-inside-face longitudinal seam 139 for the tube T, thus completing its formation at station 1.

The completed tube T with the units U therein enters the transverse sealing means which has transverse sealing jaws such as indicated at 141 and 143 in FIGS. 6 and 7 adapted to close on the tube between units U and move in a forward direction (rotate down and around clockwise from the FIG. 7 position) to pull the tube T and web W forward. These jaws 141 and 143 correspond to the jaws indicated at 71 and 24 in U.S. Pat. No. 2,976,657. The jaw 141 has a heater (not shown) therein and the jaws function to form transverse heat seals such as indicated at 145 across the tube at package length intervals with a unit U between successive tranverse seals. Also, by reference to U.S. Pat. No. 2,976,657, it will be understood that jaw 143 has a knife incorporated therein for transversely severing the tube at the transverse seals to separate the packages, which are indicated at P in FIG. 1.

Preservative gas, e.g., carbon dioxide, is introduced into the tube T via the nozzle arms 125 at a point downstream from the sealing station 1 (i.e., downstream from the nip of the presser rolls 93 and 95 and adjacent the starting point of the transverse sealing jaws 141 and 143), this starting point being indicated at 147 in FIGS. 6 and 7 and generally being the point where the jaw 143 closes on 141. It is preferred that the spatial relationship be such that no more than one unit U is situated in the tube T between the nip of the presser rolls and the starting point 147. This gas flushes the air out of the package being formed and replaces the air for preservation of the unit U. Some of the gas from nozzle 105 may also allocate itself to this purpose. By reason of the use of the double-branched nozzle 123, the preservative gas is introduced into the tube T at two points spaced across the width of the tube.

The invention is particularly suited to packaging products in a flexible packaging material which has a coating of a heat-sealable plastic on one face (e.g., face F) of a non-heat-sealable substrate, since its hot gas system accomplishes heating of the plastic on the inside faces of the side margins of a web W of such material as they approach and enter the nip of the presser rolls 93 and 95 without any danger of damaging the substrate. It has also been found that in the use of a system such as disclosed, wherein the hot gas is a preservative gas the same as that introduced into the tube T via nozzle 123 (e.g., carbon dioxide or nitrogen), a significant reduction in total gas consumption may be effected in certain instances in relation to the gas consumption of the previous gas flush system of U.S. Pat. No. 3,274,746. It has also been found that the direct heating of the sealing surface, without having to penetrate the substrates, allows sealing of difficult materials at higher speeds. Greater clarity of seal has been noted with some materials.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. The method of packaging units in flexible sheet material which is heat-sealable at least on one face thereof, comprising forming into a tube a continuous web of said material as it is fed foward with said one face of the material on the inside of the tube by bringing the side margins of the web into inside-face-to-inside-face engagement at a sealing station, said side margins converging toward one another as they travel toward and meet at said station, heating inside faces of said margins as they converge toward one another and meet at said station for heat-sealing them together by delivering hot gas between said margins and directing it to flow against the inside faces of said margins to heat said inside faces as said margins travel toward said sealing station, the gas impinging on said inside faces as said margins enter the sealing station, pressing the heated margins to seal them together at said station, and forming transverse seals across the tube at package length intervals with a unit to be packaged in the tube between successive transverse seals, the side margins coming together in a V with its apex at the sealing station and the gas being directed in downstream direction in relation to the travel of the web toward the apex of the V to impinge on the inside faces of the side margins as they meet at the apex of the V.

2. The method of claim 1 wherein the gas is one other than air for replacing air in the packages being formed.

3. The method of claim 2 wherein the gas is one adapted to serve as a perspective gas for the units in the packages being formed.

4. The method of claim 1 wherein the gas is delivered in a stream in a plane which generally bisects the V.

5. The method of claim 1 wherein the transverse seals are formed by bringing transverse sealing means into engagement with the tube starting at a point downstream from said sealing station and moving said transverse sealing means in forward direction to pull the tube and web forward, and wherein the gas is one other than air for replacing air in the packages being formed, and wherein the method further comprises the introduction into the tube at a point downstream from said sealing station and adjacent said transverse seal starting point of a gas other than air for replacing the air in the packages.

6. The method of claim 5 wherein the gas introduced into the tube is the same gas as that employed for sealing.

7. The method of claim 6 wherein the gas introduced into the tube is unheated.

8. The method of claim 6 wherein the gas is one adapted to serve as a preservative gas for the units in the packages being formed.

9. The method of claim 8 wherein the gas is introduced into the tube at a plurality of points spaced across the width of the tube.

10. Apparatus for packaging units in flexible sheet material which is heat-sealable at least on one face thereof, comprising means for forming into a tube a continuous web of said material as it is fed forward with said one face of the material on the inside of the tube by bringing the side margins of the web into inside-face-to-inside-face engagement at a sealing station, said side margins converging toward one another as they travel toward and meet at said station, means at said station for pressing said margins together, means for heating the inside faces of said margins as they approach said pressing means comprising means for delivering hot gas between said margins and directing a stream of the hot gas to impinge on the inside faces of said margins as they enter said pressing means, and means for forming transverse seals across the tube at package length intervals with a unit to be packaged in the tube between successive transverse seals, said margins coming together in a V at said pressing means and said gas directing means comprising a nozzle positioned to direct a stream of gas in downstream direction in relation to the travel of the web toward the apex of the V to hot blast the inside faces of said margins as they meet at the apex of the V.

11. Apparatus as set forth in claim 10 wherein said means for forming the transverse seals is engageable with the tube starting at a point downstream from the sealing station and movable in a forward direction to pull the tube and the web forward, and wherein means is provided for introducing into the tube at a point downstream from said sealing station and adjacent said starting point a gas other than air for replacing the air in the packages being formed.

12. Apparatus as set forth in claim 11 wherein said gas introducing means comprises a nozzle having a plurality of branches for introducing the gas into the tube at a plurality of points spaced across the width of the tube.

13. Apparatus for packaging units in flexible sheet material which is heat-sealable at least on one face thereof, comprising means for forming into a tube a web of said material as it is fed forward with said one face of the material on the inside of the tube by bringing the side margins of the web into inside-face-to-inside-face engagement at a sealing station, said side margins converging toward one another as they travel toward and meet at said station, means at said station for pressing said margins together, means for heating the inside faces of said margins as they approach said pressing means comprising means for directing a stream of hot gas on the inside faces of said margins, and means for forming transverse seals across the tube at package length intervals with a unit to be packaged in the tube between successive transverse seals, wherein said margins come together in a V at said pressing means and said gas directing means comprises a nozzle positioned to direct a stream of gas in downstream direction in relation to the travel of the web toward the apex of the V to hot blast said margins as they meet at the apex of the V, and further having means for diverting the stream of hot gas to flow out from between said margins.

14. Apparatus as set forth in claim 13 wherein said diverting means comprises an air jet for blowing air across the tip of the nozzle.

* * * * *